United States Patent
Habu

(10) Patent No.: US 6,925,169 B2
(45) Date of Patent: Aug. 2, 2005

(54) INFORMATION ENTRY DEVICE

(76) Inventor: Tomohiro Habu, 1-6-1-202 Ohara, Setagaya-ku, Tokyo 156-0041 (JP)

( * ) Notice: Subject to any disclaimer, the term of this patent is extended or adjusted under 35 U.S.C. 154(b) by 533 days.

(21) Appl. No.: 09/758,335

(22) Filed: Jan. 12, 2001

(65) Prior Publication Data

US 2002/0093488 A1 Jul. 18, 2002

(30) Foreign Application Priority Data

Jan. 13, 2000 (JP) ........................................ 2000-004959

(51) Int. Cl.$^7$ .............................................. H04M 1/00
(52) U.S. Cl. .................................. 379/368; 379/433.07
(58) Field of Search ........................... 379/368, 433.07, 379/367, 364, 363; 340/204, 5.27, 5.54; 341/23; 380/52; 713/183; 345/173

(56) References Cited

U.S. PATENT DOCUMENTS

| | | | | |
|---|---|---|---|---|
| 3,525,821 A | * | 8/1970 | Pulles .......................... | 379/365 |
| 3,846,789 A | * | 11/1974 | Germer et al. ................. | 341/2 |
| 3,952,168 A | * | 4/1976 | Barber ......................... | 379/369 |
| 4,037,219 A | * | 7/1977 | Lewis ..................... | 340/870.22 |
| 4,119,809 A | * | 10/1978 | Bianchini ..................... | 379/367 |
| 4,642,634 A | * | 2/1987 | Gerri et al. ............. | 340/870.02 |
| 5,122,997 A | * | 6/1992 | Schneider et al. ........... | 368/294 |
| 5,444,775 A | * | 8/1995 | Tobish ......................... | 379/368 |
| 6,359,838 B1 | * | 3/2002 | Taylor .......................... | 368/13 |
| 6,549,194 B1 | * | 4/2003 | McIntyre et al. ............ | 345/173 |
| 6,556,222 B1 | * | 4/2003 | Narayanaswami .......... | 345/786 |

FOREIGN PATENT DOCUMENTS

| | | |
|---|---|---|
| JP | H 02-245871 A | 10/1990 |
| JP | H 06-318186 A | 11/1994 |
| JP | H 11-86093 A | 3/1999 |
| JP | 2001-109559 A | 4/2001 |

* cited by examiner

*Primary Examiner*—Ahmad F. Matar
*Assistant Examiner*—Rasha Al Aubaidi
(74) *Attorney, Agent, or Firm*—Omori & Yaguchi USA, LLC

(57) ABSTRACT

The objective of this invention is to protect the information entry such as a PIN from theft by observation of the finger movement based on the conventional fixed arrangement of entry keys.

The present invention is an information entry device including: keys for information entry; a circular support base on which the keys are mounted concentrically and arranged circularly in order, the support base being rotatable around the center of the circular arrangement for enabling a user to rotate the entire series of the mounted keys without changing their order around the center of the circular arrangement before or after the information entry; and an information discriminator for identifying the respective information of selected keys.

This information entry device prevents a PIN or any other information entry from being stolen by someone who glances at the finger movement, since the entire series of the entry keys are rotated before or after the PIN entry. The information entry device of the present invention can be adapted for an ATM or POS terminal as well as for a touch panel screen monitor.

5 Claims, 9 Drawing Sheets

FIGURE 5

| decimal | binary | The information on the key | The infomation tag | The location of key pushed | | | | | | | | | | | |
|---------|--------|----------------------------|--------------------|---|---|---|---|---|---|---|---|---|---|---|---|
| | | | | a | b | c | d | e | f | g | h | i | j | k | l |
| 0 | 0000 | 0 | ■□■□ | 0 | * | # | 1 | 2 | 3 | 4 | 5 | 6 | 7 | 8 | 9 |
| 1 | 0001 | 1 | □■■□ | 1 | 2 | 3 | 4 | 5 | 6 | 7 | 8 | 9 | 0 | * | # |
| 2 | 0010 | 2 | ■■□□ | 2 | 3 | 4 | 5 | 6 | 7 | 8 | 9 | 0 | * | # | 1 |
| 3 | 0011 | 3 | □□■■ | 3 | 4 | 5 | 6 | 7 | 8 | 9 | 0 | * | # | 1 | 2 |
| 4 | 0100 | 4 | ■□■■ | 4 | 5 | 6 | 7 | 8 | 9 | 0 | * | # | 1 | 2 | 3 |
| 5 | 0101 | 5 | □■■■ | 5 | 6 | 7 | 8 | 9 | 0 | * | # | 1 | 2 | 3 | 4 |
| 6 | 0110 | 6 | ■■■□ | 6 | 7 | 8 | 9 | 0 | * | # | 1 | 2 | 3 | 4 | 5 |
| 7 | 0111 | 7 | □□□■ | 7 | 8 | 9 | 0 | * | # | 1 | 2 | 3 | 4 | 5 | 6 |
| 8 | 1000 | 8 | ■□□□ | 8 | 9 | 0 | * | # | 1 | 2 | 3 | 4 | 5 | 6 | 7 |
| 9 | 1001 | 9 | □■□□ | 9 | 0 | * | # | 1 | 2 | 3 | 4 | 5 | 6 | 7 | 8 |
| 10 | 1010 | * | ■■□□ | * | # | 1 | 2 | 3 | 4 | 5 | 6 | 7 | 8 | 9 | 0 |
| 11 | 1011 | # | □□□□ | # | 1 | 2 | 3 | 4 | 5 | 6 | 7 | 8 | 9 | 0 | * |

*The sensor is at the location "a".
When the key at the location "d" is pushed, and if the key at the sensor is "5", the information of the pushed key is "8".

INFORMATION ENTRY DEVICE

BACKGROUND OF THE INVENTION

1. Technical Field of the Invention

This invention relates to an information entry device, wherein provision is made for protecting the information entry such as a PIN from being stolen.

2. Description of Prior Art/Current Technology

Various kinds of financial transaction services are provided by using IT (Information Technology) these days, such as credit cards, debit cards, digital wallets by use of smart cards and so on. Information of the card is kept in the magnetic stripe or IC chip of the card. Also, we can now use a public phone by entering a call card number instead of inserting a coin.

To use these services, a PIN or password entry is required for user identification. Nowadays using a credit card requires signature. But when a smart card is used for a credit card instead of a magnetic stripe, it requires a PIN entry. The arrangement of keys of a PIN pad on an ATM and the like is specified in ISO 9564-1 Annex-E This specifies the key arrangement of a PIN pad to be configured as 3 numbers horizontal and 4 lines vertical. The numeric number starts from the left of the top line. However, this fixed arrangement makes it easy for another person to steal the PIN we enter by glancing at the movement of our finger based on the fixed arrangement of the keys.

In order to solve this problem, one may use a device that changes the key arrangement randomly on a touch panel screen monitor each time we enter our password. But this type of device is difficult to use, as the order of keys is random. This random arrangement of keys leads to mistouching the keys, and it takes a lot of time to push a number because a user has to look for the keys. Further, a serious problem is that a visually handicapped person cannot use this device. Furthermore, monitor screens of this type are expensive.

BRIEF SUMMARY OF THE INVENTION

1. The Objective of the Invention

The objective of this invention is to protect the information entry such as a PIN from theft by observation of the movement of our finger based on the fixed arrangement of the keys. Another objective is to provide ease of pushing keys for users, especially visually handicapped people, without changing the key arrangement.

2. The Method to Solve the Problem

The invention is made to achieve the above objectives. The invention is an information entry device comprising: keys for information entry; a circular support base on which the keys are mounted concentrically and arranged circularly in order, the support base being rotatable around the center of the circular arrangement for enabling a user to rotate the entire series of the mounted keys without changing their order around the center of the circular arrangement before or after the information entry; and an information discriminator for identifying the respective information of selected keys.

A user can rotate the keys before or after entering his PIN. Since the entire series of the keys is rotated, it is hard for someone to recognize the PIN by stealing a glance at the movement of the user's finger. In addition, the keys are arranged circularly in order. So it is easy for users including blind people to push the keys even after the rotation, as keys are not arranged random.

It is desirable that the information discriminator comprises: a means for identifying which key is at a predetermined fiducial point; a means for obtaining relative locations of the selected keys with respect to the key at the fiducial point; and a means for identifying the respective information of the selected keys based on the relative locations.

In this case, it is also desirable that the information discriminator includes an information tag provided for each key, and identifies the information of the key at the fiducial point by means of the information tag.

It is further desirable that the information tags comprise a binary coding system using reflectors and non-reflectors, and the information discriminator has a sensor for identifying the information of the key at the fiducial point by optically sensing the binary coding.

It is also desirable that the information of each key is displayed by raised markings, thereby enabling visually handicapped people to recognize it by touch. The Braille letters and numbers may be used.

The present invention can be applied to an information entry device comprising a touch panel monitor screen, wherein the touch panel monitor screen displays keys for information entry, which are arranged circularly in order and rotates around the center of the circular arrangement without changing the order when a user touches a predetermined option key.

In this case, again, the user can rotate the entry keys on the monitor screen before or after entering his PIN. By changing the locations of the keys by the rotation, it is possible to protect the PIN from being stolen by someone who tries to glance at the finger movement. Since the keys are still circularly arranged in order, not random, it is easy for users including visually handicapped people to touch the keys even after rotating this device. Accordingly, this invention provides a user with an information entry device that prevents the PIN theft and key-mistouching.

BRIEF DESCRIPTION OF THE DRAWING

FIG. 5: The matrix of information of the entry keys with information tags.

DETAILED DESCRIPTION OF THE PREFERRED EMBODIMENTS

The first embodiment of the information entry device of this invention is explained below with reference to FIGS. 1–6.

Figure 1:
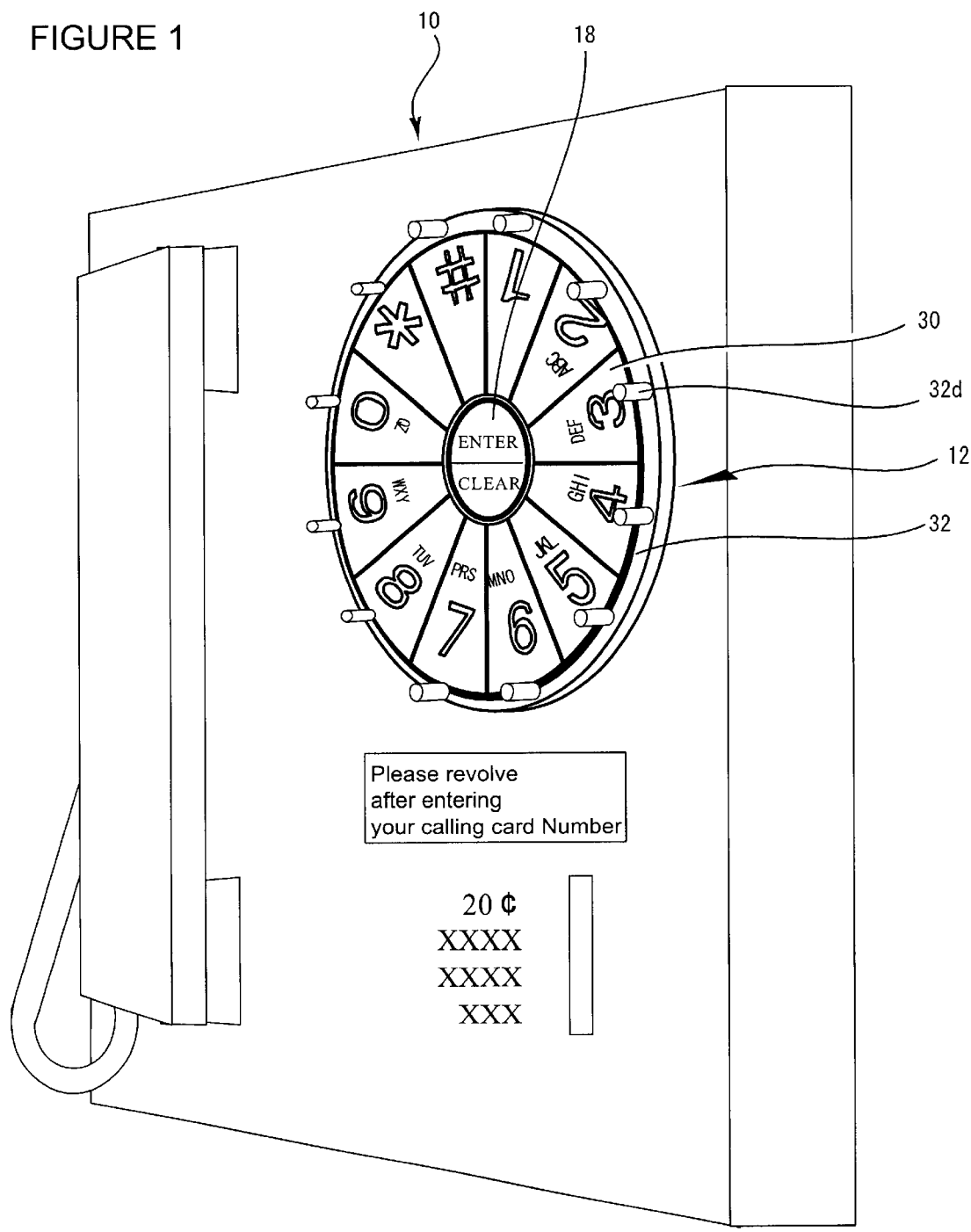
FIG. 1: The perspective view of the information entry device adapted for a public phone according to the first embodiment.

FIG. 1 is the perspective view of a public phone for which this device is adapted. The information entry device of this invention 12 is attached to the body of the public phone 10.

Figure 2:
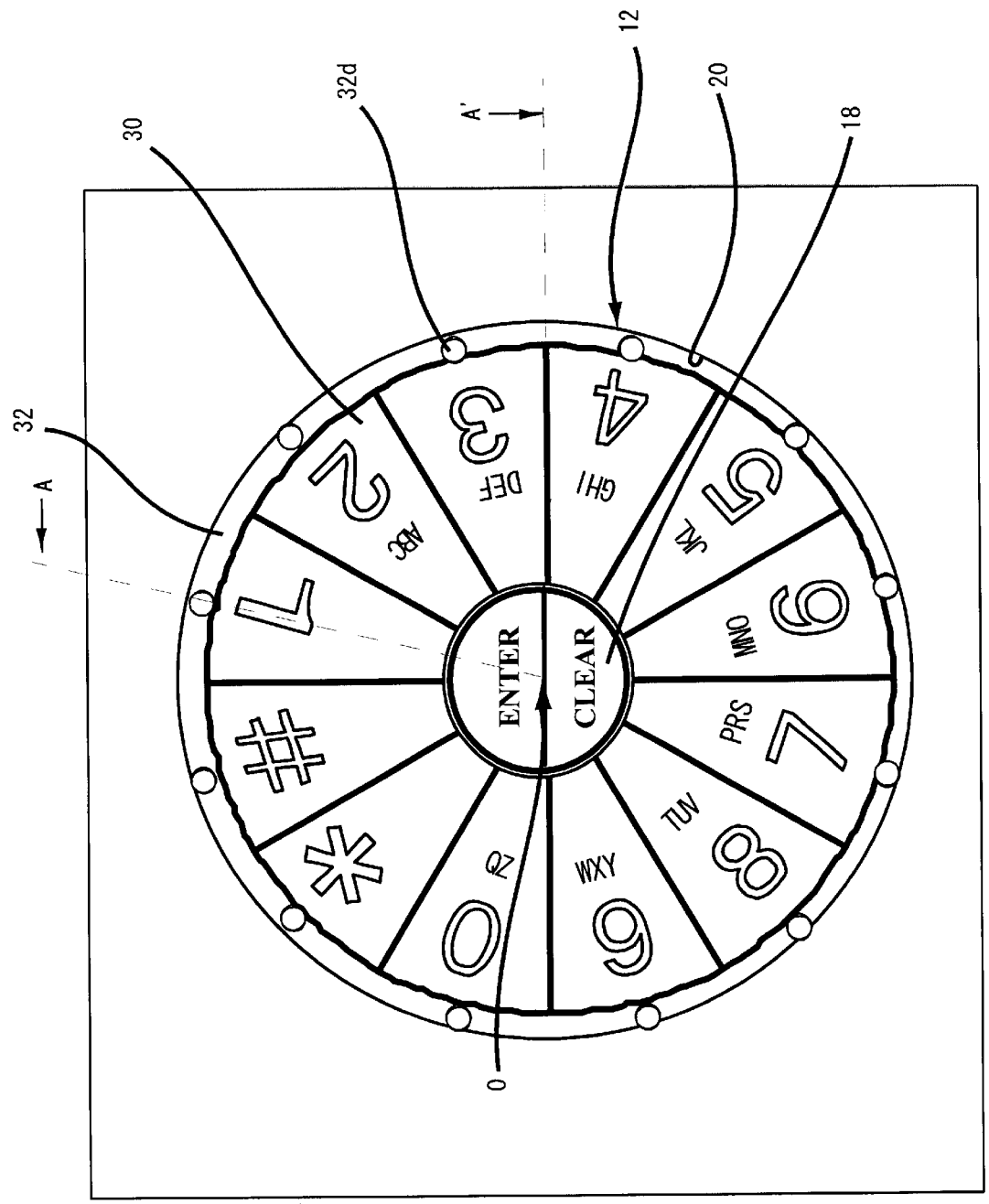
FIG. 2: The front view of the information entry device according to the first embodiment.
Figure 3:
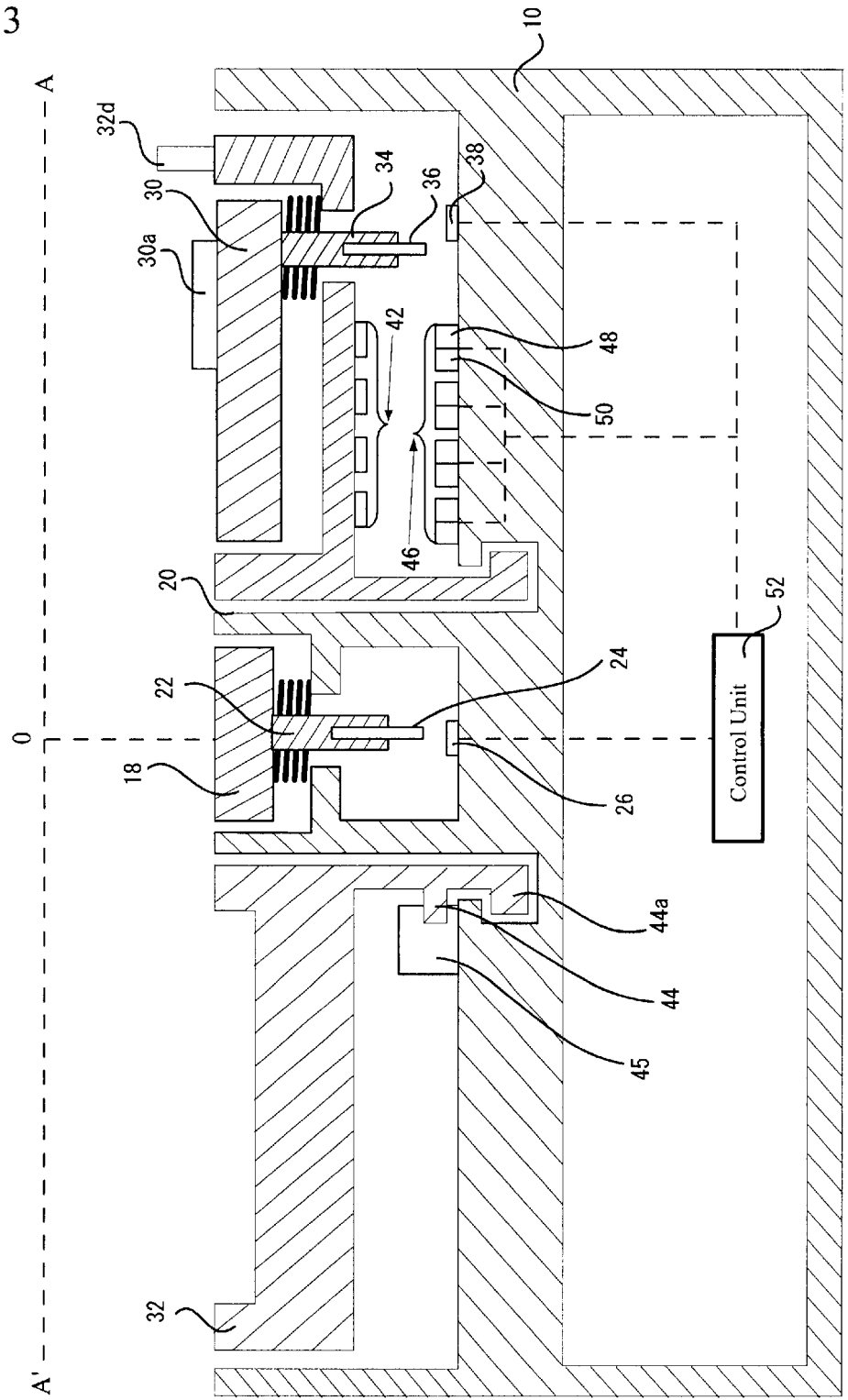
FIG. 3: The cross-sectional view along the line A-O and the cross-sectional view along the line A'-O in FIG. 2 are shown side-by-side.

FIG. 2 is the expanded view from the front of the information entry device 12. In FIG. 3, the cross-sectional view along the line A-O and the cross-sectional view along the line A-O are shown side-by-side. A center button of "Enter/Clear" 18 is installed on the body of the public phone 10 at the center of the information entry device 12. A groove 20 is concentrically provided around the center button 18 as shown in FIGS. 2 and 3. Each key 30 has a button comprising connection elements 34,36, and 38, which send the electronic signal when the button is pushed.

Figure 4:
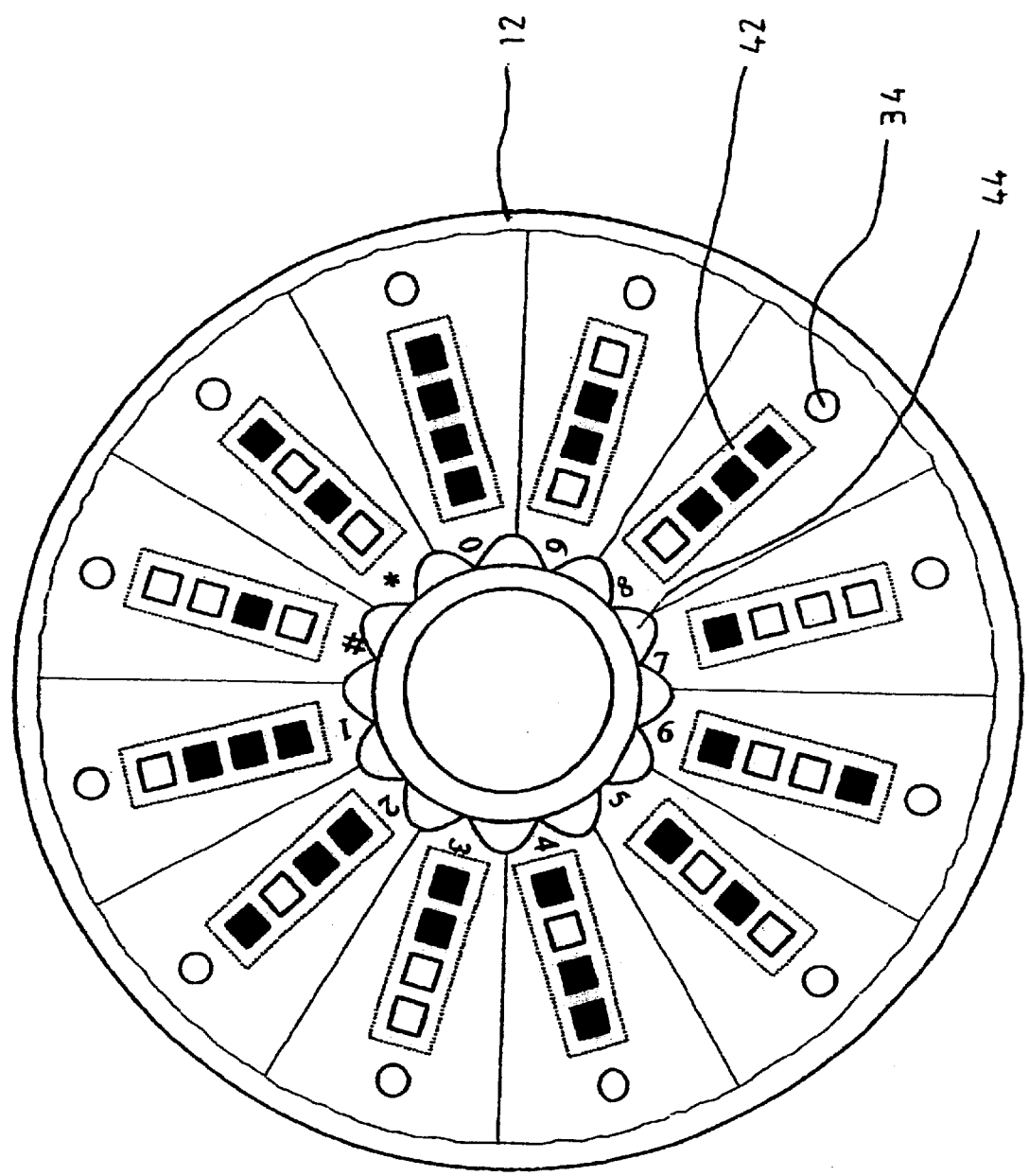
FIG. 4: The backside view of the support base of the information entry device.

The information entry device 12 has the entry keys 30 and a circular support base 32 on which the entry keys are mounted. The support base 32 is provided concentrically in the groove 20, and is able to rotate around the center button 18. Specifically, the support base is attached rotatably to the body of the public phone 10 by means of a small groove formed by protrusions 44 and 44a. As shown in FIGS. 3 and 4, pairs of the protrusions 44 and 44a are provided between individual entry keys 30. A ratchet 45 for engaging one of the protrusions 44 is provided on the body of the public phone 10 in order to stop the rotation at the right point where the buttons of the keys work.

Twelve entry keys 30 are circularly arranged on the support base 32. The numbers and symbols such as 0–9, # and * are displayed on respective keys 30 by raised markings 30a, in order to enable visually handicapped people to recognize the respective information of the keys by touch. Knobs 32d are provided at the edge of the support base 32 so as to enable users to easily rotate the support base.

As shown in FIG. 3, an information tag 42 is attached on the backside of the support base 32 below each entry key 30. The information tags 42 have a binary coding system using reflectors and non-reflectors as shown in FIGS. 4 and 5. For example, the second line of FIG. 5 shows the case of "1" wherein the rightmost is a reflector and the others are non-reflectors.

Figure 6:
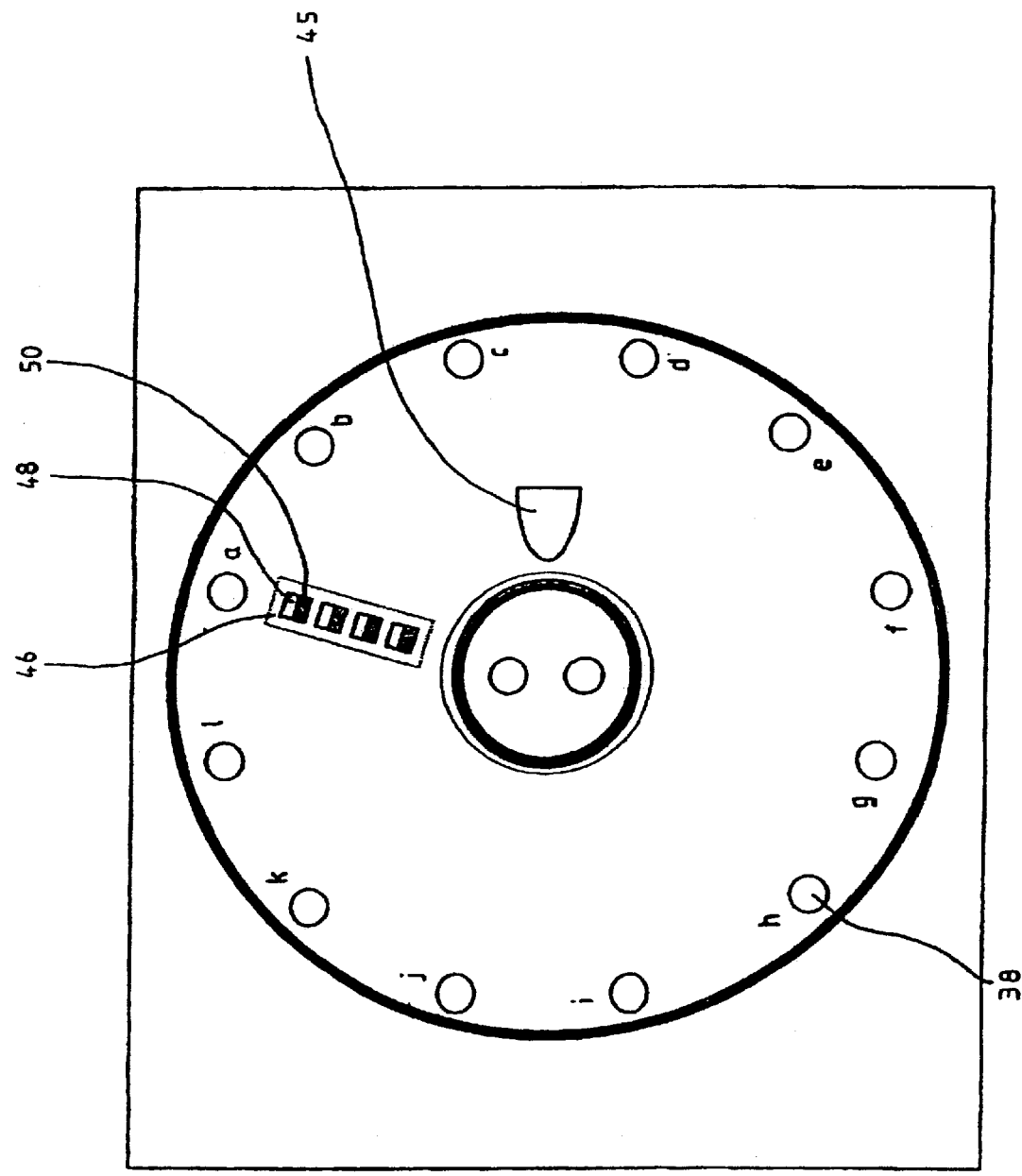
FIG. 6: The front view of the bottom of the groove provided on the body of the public phone.

As shown in FIGS. 3 and 6, a sensor 46 is attached at a predetermined fiducial point on the groove 20. The sensor 46 has four pairs of an optical sensor 50 and a light-emitting diode (LED) 48. This sensor 46 is connected to a control unit 52.

How this information entry device works when a user enters his PIN is explained as follows. First, the user arbitrarily rotates the support base 32 using the knobs 32d. The rotation will stop at some right position by means of the ratchet 45 for engaging one of the protrusions 44, where the button 34,36, and 38 of each key works. Then the user pushes the "Enter/Clear" key 18. The button comprising connection elements 22, 24, and 26 sends an electronic signal to the control unit 52. Then the control unit 52 receives the information of the key at the fiducial point from the sensor 46. When the user pushes a necessary entry key, the control unit recognizes the information of the entry key that the user pushed by obtaining the relative location of the key pushed with respect to the fiducial point, as shown in FIG. 5.

When the information of the key at the fiducial point is "1", and the key pushed is the second right of the fiducial point, the control unit 52 recognizes that the information of the key pushed is "3". (This is the case wherein the key at the fiducial point is "a" which is actually "1" as sensed by the sensor 46, and the key "c" is pushed, as can be seen in FIG. 6.) The user finishes entering his 4 digit PIN by pushing three more keys, and the above key-recognition process repeats three more times.

The second embodiment of the information entry device of this invention is explained below with reference to FIGS. 7–9.

Figure 7:
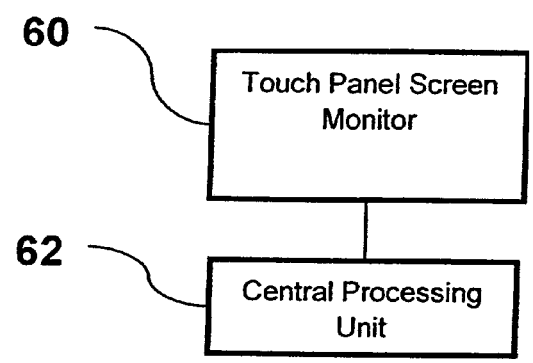
FIG. 7: The overview of the touch panel screen of an ATM.

FIG. 7 is an overview of the touch panel screen of an ATM. This device has the touch panel 60 and a Central Processing Unit (CPU) 62. The CPU 62 recognizes the location touched on the touch screen monitor and controls the display on the touch screen monitor.

Figure 8:
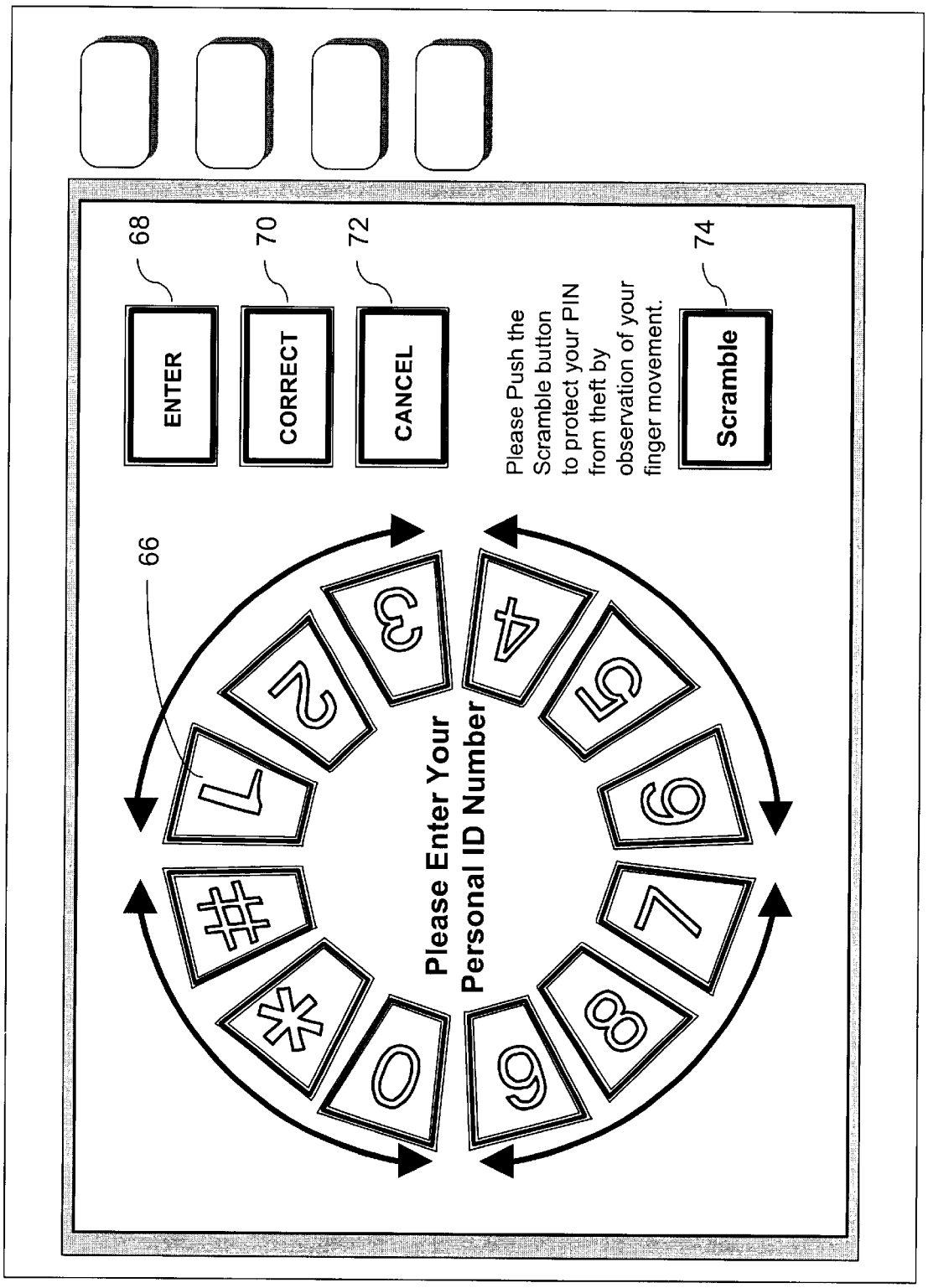
FIG. 8: The PIN entry screen of an ATM using the information entry device according to the second embodiment.
Figure 9:
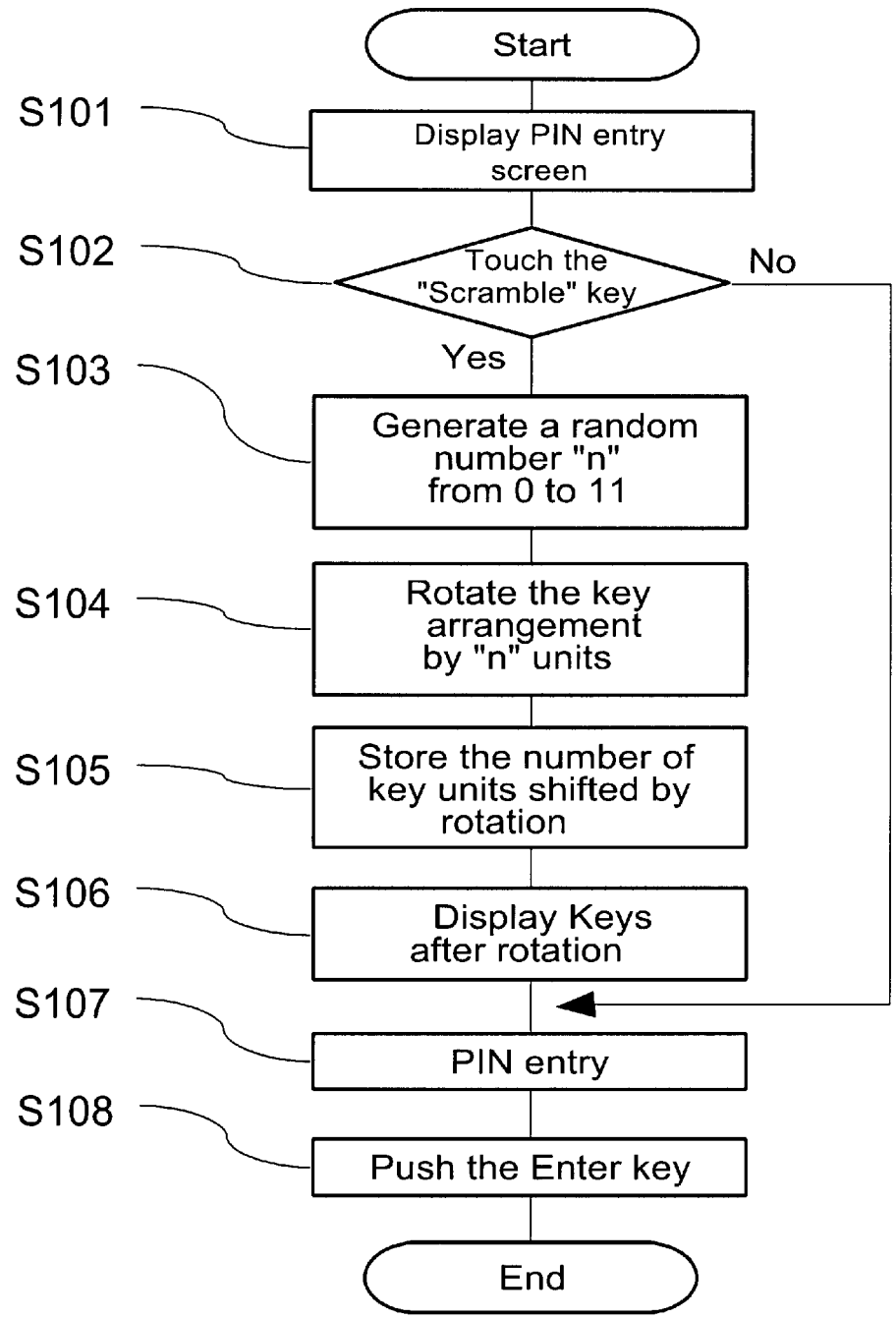
FIG. 9: The flowchart showing how the information entry device works.

FIG. 8 shows the PIN entry screen of an ATM for which the information entry device of the present invention is adapted. The CPU 62 controls the touch screen monitor, which displays entry keys 66, an "Enter" button 68, a "Correct" button 70, a "Cancel" button 72, and a "Scramble" button 74. The twelve keys 66 have respective information of 0–9, # and *. These keys are circularly arranged in order. When the user touches the "Scramble" button 74, these entry keys 66 rotate in order and stop at some point. After the rotation of the keys, the CPU 62 obtains the rotation information by storing the number of key units shifted by the rotation.

How this information entry device works in the second embodiment is explained as follows with reference to the flowchart shown in FIG. 9. First a user inserts his card into the ATM to display the PIN entry screen (S101). Then the screen monitor displays the entry keys 66 circularly in order. When the user touches the "Scramble" button 74 on the screen monitor (S102), the CPU 62 generates a random number (S103) and makes the keys on the screen rotate by this random number of key units (S104). And the CPU stores the number of key units shifted by the rotation (S105), and displays the entry keys again (S106). In case the user does not touch the "Scramble" button, the user directly goes to the PIN entry step (S107). The user enters his PIN by touching the entry keys 66 displayed on the touch screen monitor 60. Then the CPU 62 recognizes which keys were selected by matching the locations the user touched and the displayed information of the keys (S107). When the user pushes the "Enter" button 68 after completing the PIN entry (S108), the CPU 62 finishes the PIN entry processing.

The user has an option of entering his PIN without pushing the "Scramble" button 74. (from S102 to S108) Alternatively, the user may push the "Scramble" button 74 after entering his PIN.

As mentioned above, the user can rotate the entry keys before or after entering his PIN. By changing the location of the keys by the rotation, it is possible to protect the PIN from theft by observation of the finger movement. Since the keys are still circularly arranged in order, not random, it is easy for users including visually handicapped people to touch the keys even after rotating this device. Accordingly, this invention provides a user with an information entry device that prevents the PIN theft and key-mistouching.

The first embodiment of this invention can be used for ATM or POS terminals. The second embodiment of this invention can be used for a PIN pad of multimedia terminals for various services, which require a PIN or password entry. It is to be understood that the above-described embodiments are illustrative of only a few of the many possible specific embodiments that can represent applications of the principles of the invention. Numerous and varied other arrangements can be readily devised by those skilled in the art without departing from the spirit and scope of the invention.

What is claimed is:

1. An information entry device comprising:
   push-button keys for information entry;
   a circular support base on which the keys are mounted concentrically and arranged circularly in order, the support base being rotatable around the center of the circular arrangement;

knobs provided on the support base for rotating the support base by an arbitrary angle before or after the information entry so as to shift the entire series of the mounted keys around the center of the circular arrangement without changing their order; and an information discriminator for identifying the respective information of selected keys.

2. The information entry device according to claim 1, wherein the information discriminator comprises:

a means for identifying which key is at a predetermined fiducial point;

a means for obtaining relative locations of the selected keys with respect to the key at the fiducial point; and a means for identifying the respective information of the selected keys based on the relative locations.

3. The information entry device according to claim 2, wherein the information discriminator includes an information tag provided for each key, and identifies the information of the key at the fiducial point by means of the information tag.

4. The information entry device according to claim 3, wherein the information tags comprise a binary coding system using reflectors and non-reflectors, the information discriminator having a sensor for identifying the information of the key at the fiducial point by optically sensing the binary coding.

5. The information entry device according to claim 1 or 4, wherein the information of each key is displayed by raised markings.

* * * * *